United States Patent
Furuskär et al.

(10) Patent No.: US 6,704,898 B1
(45) Date of Patent: Mar. 9, 2004

(54) COMBINED HYBRID AUTOMATIC RETRANSMISSION REQUEST SCHEME

(75) Inventors: Anders L. Furuskär, Stockholm (SE); Stefan E. Jäverbring, Älvsjo (SE); Farooq U. Khan, Kiste (SE); Johan P. A. Nyström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/420,794

(22) Filed: Oct. 19, 1999

Related U.S. Application Data

(60) Provisional application No. 60/105,372, filed on Oct. 23, 1998.

(51) Int. Cl.[7] .......................... H04L 1/18; H03M 13/00
(52) U.S. Cl. .................... 714/751; 714/774; 714/749
(58) Field of Search .............................. 714/749, 774, 714/751

(56) References Cited

U.S. PATENT DOCUMENTS

| | | | | |
|---|---|---|---|---|
| 5,526,399 A | * | 6/1996 | Kameda | 455/74.1 |
| 5,663,957 A | * | 9/1997 | Dent | 370/347 |
| 5,671,156 A | * | 9/1997 | Weerackody et al. | 714/52 |
| 5,907,563 A | * | 5/1999 | Takeuchi et al. | 714/751 |
| 5,954,839 A | * | 9/1999 | Park et al. | 714/699 |
| 6,208,663 B1 | * | 3/2001 | Schramm et al. | 370/465 |

FOREIGN PATENT DOCUMENTS

| | | | | |
|---|---|---|---|---|
| EP | 0771 092 A1 | 5/1997 | | |
| GB | 2 311 449 A | 9/1997 | | |
| JP | 06046037 A | * 2/1994 | ............ | H04L/1/16 |
| WO | WO 99/12303 | 3/1999 | | |

OTHER PUBLICATIONS

Qinqing Zhang and Kassam, S.A.; Hybrid ARQ with selective combining for fading channels; IEEE Journal on Selected Areas in Communications, vol.: 17, Issue: 5, May 1999 pp.: 867–880.*

Qinqing Zhang and Kassam, S.A.; Hybrid ARQ with selective combining for video transmission over wireless channels; Proceedings International Conference on Image Processing, 1997, pp.: 692–695 vol. 2.*

Shu Lin & Daniel J. Costello, Jr.; Error Control Coding: Fundamentals and Applications; Prentice–Hall, 1983.*

J. Hagenauer, Rate–compatible punctured convolutional codes (RCPC codes) and their applications, IEEE Transactions on Communications, vol.: 36 Issue: 4, Apr. 1988, pp.: 389–400.*

Stephen B. Wicker, Error Control Systems for Digital Communication and Storage, Prentice–Hall, 1995.*

Sandberg et al., "Retransmission Schemes for Meteor–Burst Communications", Computers and Communications, 9th Annual Int'l. Phoenix Conf., pp. 246–253, 1990.

Tanaka et al., "Performance of Reed–Solomon Coded Type–I Hybrid ARQ Scheme on Fading Channels", The Key to Global Prosperity, 3:2148–2152, 1996.

S. Kallel, "Complimentary Punctured Convolutional (CPC) Codes and their Applications", IEEE Transactions on Communications, 43(6):2005–2009, 1995.

Sim et al., "Adaptive Hybrid ARQ Scheme Using Concatenated FEC for ATM over Wireless Links", Electronic Letters, 34(24):2303–2304, 1998.

* cited by examiner

Primary Examiner—Albert Decady
Assistant Examiner—Joseph D. Torres
(74) Attorney, Agent, or Firm—Burns, Doane, Swecker & Mathis, LLP

(57) ABSTRACT

A transmitter operates using a scheme that allows receivers using either Type I Hybrid ARQ or receivers using Type II Hybrid ARQ to successfully receive and decode blocks from a common transmitter without the need for the transmitter to be informed of which scheme is being employed by the receivers.

48 Claims, 9 Drawing Sheets

| Scheme | Modulation | Maximum Rate [kbps] | Code Rate | Header Code Rate | Blocks per 20 ms | Family |
|---|---|---|---|---|---|---|
| MCS-8 | 8PSK | 59.2 | 1.0 | 0.35 | 2 | A |
| MCS-7 |  | 44.8 | 0.76 | 0.35 | 2 | B |
| MCS-6 |  | 29.6 | 0.49 | 1/3 | 1 | A |
| MCS-5 |  | 22.4 | 0.37 | 1/3 | 1 | B |
| MCS-4 | GMSK | 17.6 | 1.0 | 1/2 | 1 | C |
| MCS-3 |  | 14.8 | 0.80 | 1/2 | 1 | A |
| MCS-2 |  | 11.2 | 0.66 | 1/2 | 1 | B |
| MCS-1 |  | 8.8 | 0.53 | 1/2 | 1 | C |

COMBINED HYBRID AUTOMATIC RETRANSMISSION REQUEST SCHEME

This application claims the benefit of U.S. Provisional Application No. 60/105,372, filed on Oct. 23, 1998, the contents of which are hereby incorporated by reference in its entirety.

BACKGROUND OF THE INVENTION

The present invention generally related to error handling in the field of communication systems and, more particularly to error handling using forward error correction (FEC), automatic retransmission requests (ARQ) and variable redundancy in digital communication systems.

Reference is made to a related application, "Method and System for Measurement Based Automatic Retransmission Request in a Radiocommunication System" which was filed as U.S. patent application Ser. No. 09/168,064 on Oct. 8, 1998, the contents of which are hereby incorporated by reference in its entirety.

The growth of commercial communication systems and, in particular, the explosive growth of cellular radiotelephone systems, have compelled system designers to search for ways to increase system capacity without reducing communication quality beyond consumer tolerance thresholds. One technique to achieve these objectives involved changing from analog modulation based systems to digital modulation based systems.

In wireless digital communication systems, industry standards define most of the system parameters, including, for example, modulation type, burst format, communication and protocol. For example, the European Telecommunication Standard Institute (ETSI) established the Global System for Mobile Communications (GSM) standard that uses time division multiple access (TDMA) to transmit control, voice and data information over radio frequency (RF) physical channels or links and a Gaussian Minimum Shift Keying (GMSK) modulation scheme at a symbol rate of 271 kilosymbols per second (ksps). In the United States, the Telecommunication Industry Association (TIA) has published a number of Interim Standards, such as IS-54 and IS-136, that define various versions of Digital Advanced Mobile Phone Service (D-AMPS), a TDMA system that uses a Differential Quadrature Phase Shift Keying (DQPSK) modulation scheme for communicating data over RF links.

TDMA systems subdivide the allocated frequency into one or more RF channels. Each of the RF channels is further divided into a number of time frames. Each time frame is then divided into a number of timeslots, (e.g., three timeslots), wherein each timeslot corresponds to a physical channel. Logical channels are then formed from one or several physical channels. In these systems the mobile stations communicate with one or more base stations by transmitting and receiving bursts of digital information over uplink and downlink RF channels.

Digital communication systems employ various techniques to handle erroneously received information. One such technique is FEC. In general, FEC involves transmitting additional bits that are used at the receiving end to verify the accuracy of the transmission, and if necessary, correct any errors. FEC techniques involve convolutional or block coding of the data prior to modulation, wherein it is common to refer to convolutional codes by a code rates (e.g., $\frac{1}{2}$ and $\frac{1}{3}$), wherein a lower code rates involves a greater number of code bits. Therefore, a lower code rate typically provides greater error protection. However, it also results in a lower user bit rate.

The technique used to select a code rate is called Link Adaptation (LA). LA works in conjunction with FEC by monitoring the quality of the channel or link and adjusting the code rate accordingly. For example, if the quality of the link is low, the code rate will be lowered. Alternatively, if the quality of the link is high, the code rate may be raised in order to provide a higher user bit rate.

Another common technique for handling erroneously received information is known as ARQ. In general, ARQ involves analyzing a received block of data for errors at the receiver and requesting that the sender retransmit the block of data if errors are detected. When processed by a receiver (e.g., a receiver in a mobile radio telephone), each block can, after demodulation, be evaluated for errors using a block check sequence and well known cyclic redundancy check techniques. If there are errors, then a request is sent back to the transmitting entity (e.g., a base station in a radiocommunication system) denoting the block to be resent using predefined ARQ protocols.

As one skilled in the art will appreciate, FEC techniques (e.g., FEC techniques including LA) may be combined with ARQ techniques. Such combined techniques are commonly referred to as hybrid ARQ techniques. Hybrid ARQ techniques permit correction of some received errors using FEC coding at the receiver, while correction of other errors may require retransmission.

FIG. 1 illustrates an exemplary hybrid ARQ scheme, known as Type I Hybrid ARQ. Type I Hybrid ARQ is used in conjunction with General Packet Radio Service (GPRS), wherein four FEC Modulation and Coding Schemes (MCS), CS-1 through CS4 are employed with coding rates of $\frac{1}{2}$, $\frac{2}{3}$, $\frac{3}{4}$, and 1, respectively. After one of the four FEC MCS is selected (using LA) for a current Logical Link Control (LLC) frame 110, segmentation of this frame to Logical Link Control (LLC) blocks, corresponding to the selected coding scheme, is performed. The LLC blocks include a payload of information 111, a frame header (H1) and a frame check sequence (FCS). The LLC blocks are coded with the selected rate forming a coded block 112. In order to reduce the number of bits in the coded block, bits can be removed using a known puncturing pattern to form the punctured coded block that will be used as the radio link control (RLC) block 113. If an RLC block is found to be erroneous at the receiver (i.e., it has errors which cannot be corrected) and needs to be retransmitted, the originally selected FEC coding (and puncturing) scheme is used for retransmission (i.e., this system employs fixed redundancy for retransmission purposes).

Another exemplary hybrid ARQ scheme, known as Incremental Redundancy (IR) or Type II hybrid ARQ, provides for additional redundant bits to be transmitted if the originally transmitted block cannot be decoded. This scheme is conceptually illustrated in FIG. 2. Therein, multiple decoding attempts are made by the receiver. First the receiver attempts to decode the originally received data block. If the receiver is unable to decode the originally received data block, the receiver sends a retransmission request to the sender. The receiver then receives additional redundant block R1, which it uses in conjunction with the originally transmitted data block to attempt decoding. The probability of decoding is increased due to the diversity of the two transmitted blocks. The Type II Hybrid ARQ retransmission (R1, R2) is optimized to be decoded in combination with previous transmissions and may or may not be separately decodable. If the receiver still cannot decode the data block, the receiver obtains another block of redundant information R2, which it uses in conjunction with the originally received data block and the block of redundant bits RI to attempt decoding for a third time. This process can be repeated until successful decoding is achieved.

For a further discussion of Type II Hybrid ARQ, reference is made to "Complementary Punctured Convolutional (CPC) Codes and Their Applications," by S. Kallel in *IEEE Transactions on Communications*, volume 23, number 6, published June 1995, the content of which is hereby incorporated by reference in its entirety.

Presently, using the above techniques, if a receiver using Type I Hybrid ARQ attempts to communicate with a transmitter using Type II Hybrid ARQ, assuming the coding scheme of the first transmitted block was known to the receiver, the receiver would not be able to decode any retransmission. In addition, even if the coding scheme for the retransmission was communicated to the Type I Hybrid ARQ receiver, the quality of service would be greatly diminished since the Type I Hybrid ARQ receiver will discard previous transmissions and the retransmissions are not optimized to be separately decodable.

Therefore, it is desirable for a transmitter to operate using a scheme that will allow receivers using either Type I Hybrid ARQ or receivers using Type II Hybrid ARQ to successfully receive and decode blocks from a common transmitter without the need for the transmitter to know which scheme is being employed by the receivers.

SUMMARY OF THE INVENTION

The present invention describes a transmitter that operates using a scheme that allows receivers using either Type I Hybrid ARQ or receivers using Type II Hybrid ARQ to successfully receive and decode blocks from a common transmitter without the need for the transmitter be informed of which scheme is being employed by the receivers.

According to a first aspect of the present invention, provided is a system for communicating blocks of information to and from a transmitter and a receiver. The system comprises a transmitter that operates in an ARQ transmission mode and a plurality of receivers including a first receiver that operates in a first reception mode and a second receiver that operates in a second reception mode. The first receiver and the second receiver communicate with the transmitter while the transmitter operates in the ARQ transmission mode.

According to a further aspect of the present invention, provided is a communication device that operates in an ARQ mode. The communication device comprises a memory that stores a plurality of coding schemes in a predetermined order. The communication device also includes a receiver that receives a block and one or more retransmitted blocks. The receiver individually processes each of the one or more retransmitted blocks using a different coding scheme corresponding to the predetermined order of the coding schemes stored in the memory. In addition, the block and each of the one or more retransmitted blocks are coded using the plurality of coding schemes and have a substantially equal probability of being independently decoded by the communication device.

According to a further aspect of the present invention, provided is a method of transmitting and receiving blocks in a communication system. The method comprises transmitting the blocks in an ARQ transmission mode; receiving the blocks, at a first receiver, operating in a first reception mode; and receiving the blocks, at a second receiver, operating in a second reception mode.

According to a further aspect of the present invention, provided is a method of receiving a block from a transmitter.

The method comprises storing a plurality of coding schemes in a predetermined order; receiving, at a receiver, the block and one or more retransmitted blocks from the transmitter; and individually processing, at the receiver, each of the one or more retransmitted blocks using a different coding scheme corresponding to the predetermined order of the plurality of coding schemes. Each block and each of the one or more retransmitted blocks are coded using the plurality of coding schemes and have a substantially equal probability of being independently decoded by the receiver.

BRIEF DESCRIPTION OF THE DRAWINGS

These and other features, aspects, and advantages of the present invention will be understood by reading this description in conjunction with the drawings in which.

DETAILED DESCRIPTION

The present invention utilizes a new technique in which the transmitter does not need to be informed of the actual mode (e.g., Type I or Type II Hybrid ARQ) used by the receiver.

The following exemplary embodiments are provided in the context of TDMA radiocommunication systems. However, those skilled in the art will appreciate that TDMA is merely used for the purposes of illustration and that the present invention is readily applicable to other types of access methodologies including frequency division multiple access (FDMA), code division multiple access (CDMA) and hybrids thereof.

Moreover, operation in accordance with the GSM system is described in European Telecommunication Standard Institute (ETSI) documents ETS 300 573, ETS 300 574, and ETS 300 578, which are hereby incorporated by reference in their entireties. Therefore, the operations of the GSM system in conjunction with the present invention is only described herein to the extent necessary for understanding the present invention. Although, the present invention is described in terms of exemplary embodiments in an enhanced GRPS system, those skilled in the art will appreciate that the present invention could be used in a wide variety of other digital communication systems, such as those based on wideband CDMA or wireless Asynchronous Transfer Mode (ATM).

Figure 1:
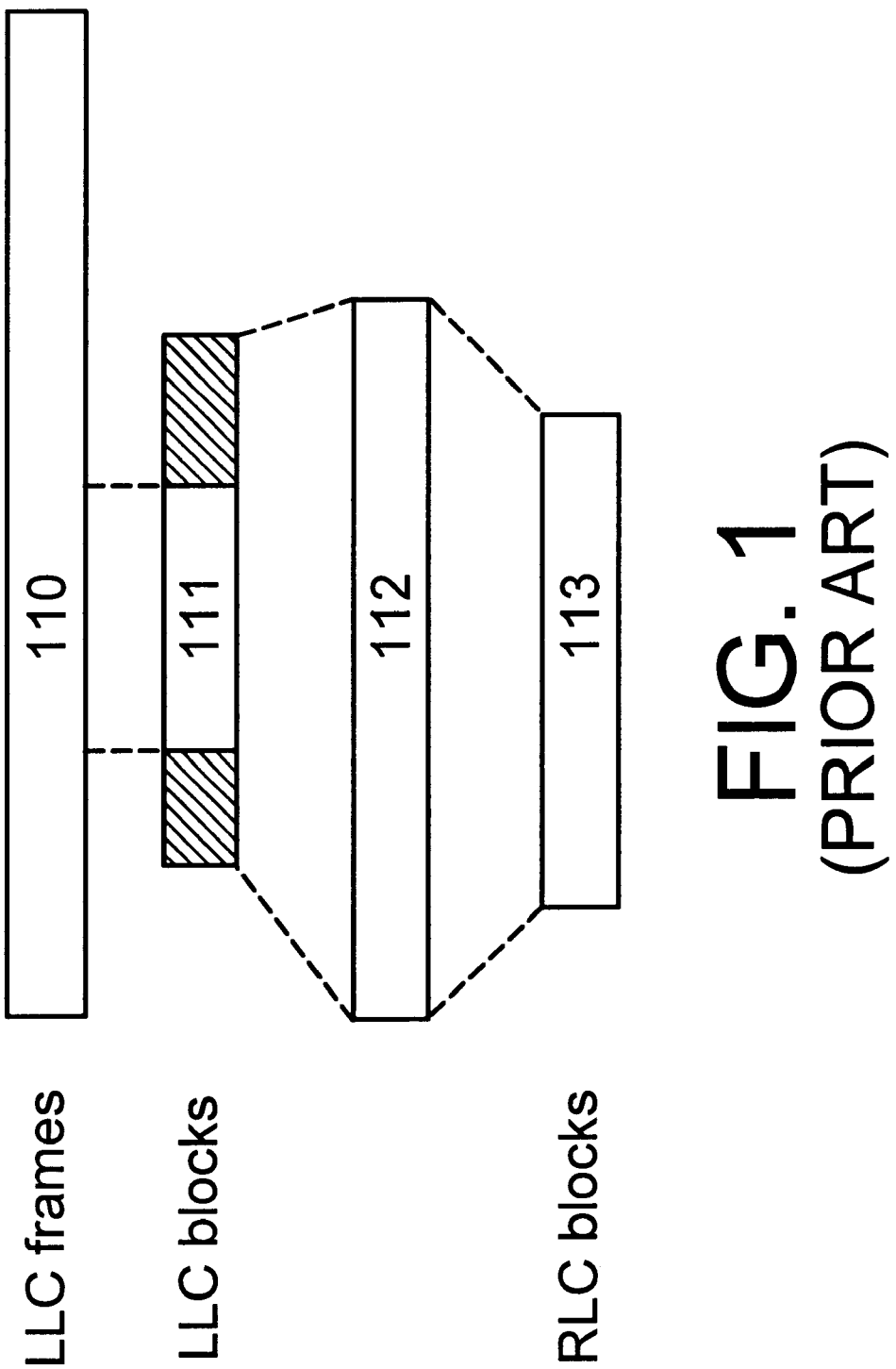
FIG. 1 illustrates an exemplary FEC scheme.
Figure 2:
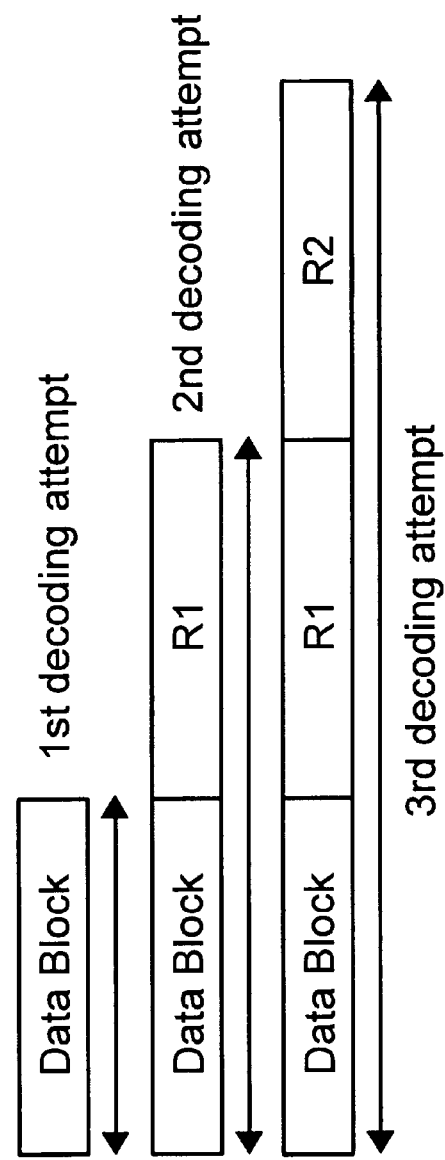
FIG. 2 illustrates an exemplary hybrid ARQ scheme.
Figure 2:
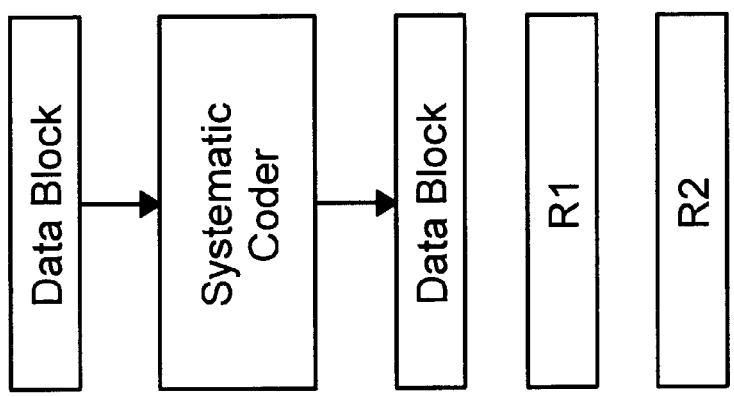
Figure 3:
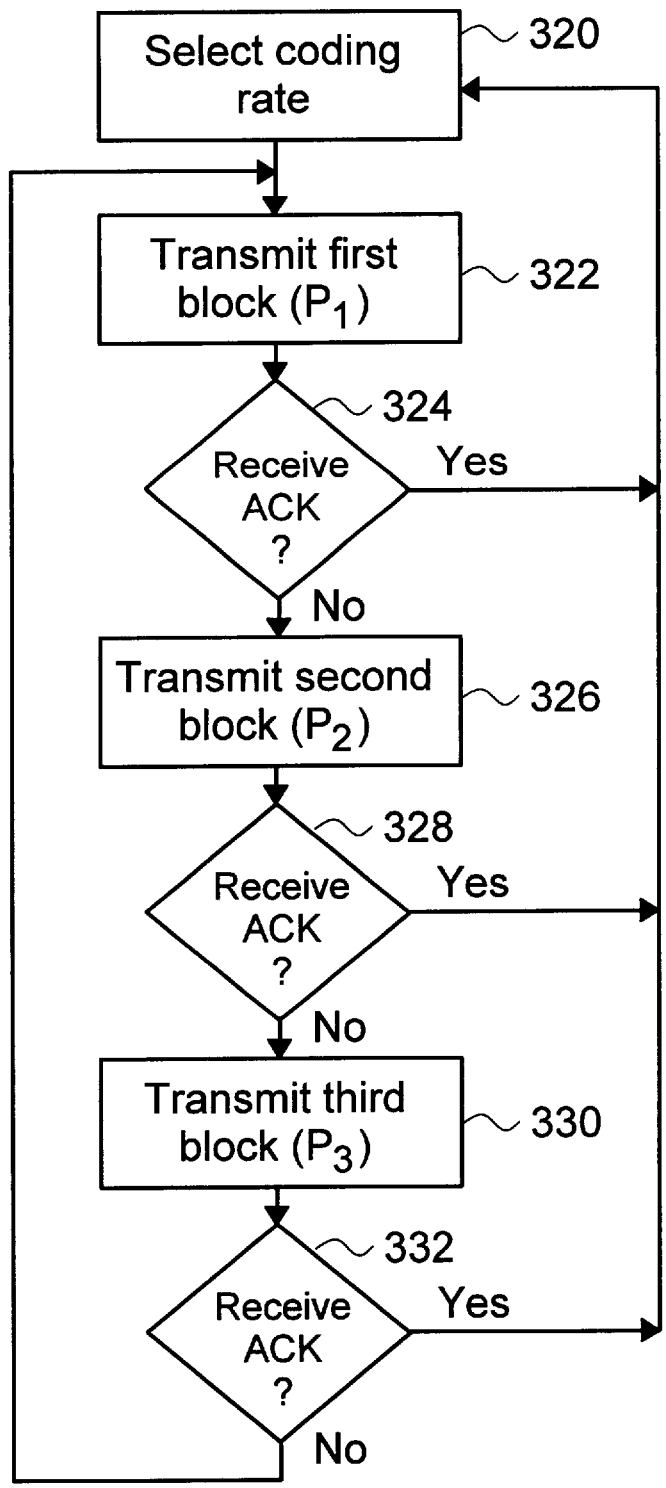
FIG. 3 is a flow chart of a process performed by an exemplary transmitter of the present invention.

FIG. 3 illustrates a technique for transmitting blocks to a receiver in accordance with a first embodiment of the present invention, wherein blocks are transmitted and retransmitted to a receiver using different coding schemes. A coding rate from a coding scheme is selected in step 320 (e.g., $[1, \frac{1}{2}, \ldots, 1/n]$, $[1, \frac{2}{3}, \ldots, 2/n]$, or $[1, \frac{3}{4}, \ldots, 3/n]$). For purposes of illustration, the first code rate sequence (i.e., $(1, \frac{1}{2}, \ldots 1/n)$) is used with a selective repeat ARQ scheme in the following discussion. A coded block using a first coding scheme $P_1$ (e.g., a convolution and/or puncturing scheme) is transmitted to a receiver in step 322. In step 324, the transmitter awaits an acknowledgment signal (ACK). If no ACK is received or if a non-acknowledgment signal (NACK) is received, then the same block is transmitted in step 326 using a second coding scheme. If in step 328, no ACK is received or if a non-acknowledgment signal (NACK) is received, then the same block is transmitted in step 330 using a third coding scheme. This process can be repeated for n number of coding schemes $P_n$ at which point the process returns to step 322 with coding scheme $P_1$.

The second (and subsequent) coding schemes are optimized to have substantially the same probability of decoding as the first coding scheme. Since, for example, a Type I Hybrid ARQ receiver will decode successive blocks separately and a Type II Hybrid ARQ receiver will decode successive blocks jointly, by using coding schemes that have diversity as well as have substantially the same probability of decoding, both Type I and Type II Hybrid ARQ receivers will be able to decode the transmitted blocks without significantly reducing the quality of service for the transmission.

In order to optimize the coding schemes to have substantially the same probability of decoding, the different codes need to have a high number of distances between corresponding trellis paths. Each trellis path, for example, corresponds to a polynomial of a convolutional code that is punctured using a particular puncturing pattern. In order to increase the probability of decoding a particular coding scheme, the minimum distance for all of the trellis paths should be as high as possible (e.g., for a code rate of 1/3 and a constraint length of 7, a high value for the minimum distance is 14–15) In addition, the actual occurrence of the minimum distance for all trellis paths should be kept as low as possible (e.g., 1). Once a coding scheme is selected (e.g., $P_1$) using the above method, then the next best coding scheme is selected and so forth (e.g., $P_2$, $P_3$, $P_n$). The next best coding scheme is determined by using the same procedure as stated above with respect to the best coding scheme.

Once multiple coding schemes are determined which have substantially the same probability of decoding, the coding schemes can be optimized for joint decoding by selecting coding schemes that, in combination, have a high minimum distance. That is, for example, the differences in trellis paths using the first coding scheme can be examined in combination with the differences in trellis paths using additional coding schemes in order to measure the distance in trellis paths for all of the coding schemes.

An exemplary technique of generating three puncturing patterns ($P_i$, $P_j$, $P_k$) for use with the present invention is described below. A plurality of puncturing patterns $P_i$, where i=1 to N are created that correspond to a desired code rate, (e.g., the puncturing patterns reduce the number of total output bits per convolutional code, thereby increasing the code rate). The minimum distance, $d_{min\_i}$ for each trellis path of $P_i$ is calculated. A first threshold value, $d_{threshold\_1}$, is determined that represents an acceptable minimum distance threshold for a single puncturing pattern for a particular code rate of a communication system. A second threshold value, $d_{threshold\_2}$, is determined that represents an acceptable minimum distance threshold for the joint decoding of two puncturing patterns for a particular code rate of a communication system. A third threshold value, $d_{threshold\_3}$, is determined that represents an acceptable minimum distance threshold for the joint decoding of three puncturing patterns for a particular code rate of a communication system. Each successive threshold value will be less than or equal to the previous threshold value. The number of threshold values calculated corresponds to the number of puncturing patterns that will be used by the communication system of the present invention.

Three puncturing patterns ($P_i$, $P_j$, $P_k$) are selected such that: the minimum distance of $P_i$ ($d_{min\_i}$), the minimum distance of $P_j$ ($d_{min\_j}$), and the minimum distance of $P_k$ ($d_{min\_k}$) are all greater than $d_{threshold\_1}$; the minimum distance of $P_i$ and $P_j$ ($d_{min\_i+j}$), the minimum distance of $P_j$ and $P_k$ ($d_{min\_j+k}$), and the minimum distance of $P_i$ and $P_k$ ($d_{min\_i+k}$) are all greater than $d_{threshold\_2}$; and the minimum distance of $P_i$, $P_j$, and $P_k$ ($d_{min\_i+j+k}$) is greater than $d_{threshold\_3}$. Puncturing patterns which satisfy the above criteria are therefore optimized to be decodable both individually (e.g., in a Type I Hybrid ARQ system) and in combination (e.g., in a Type II Hybrid ARQ system).

Figure 4:
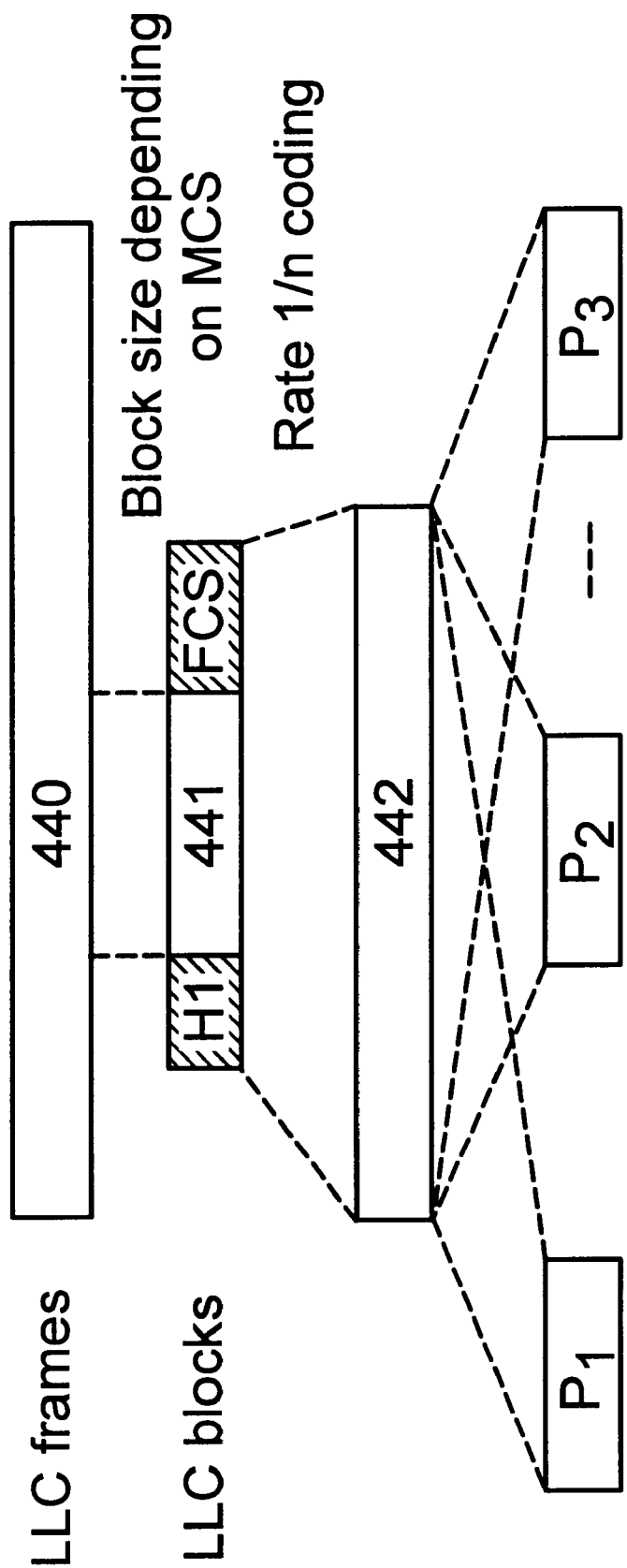
FIG. 4 illustrates an exemplary hybrid ARQ scheme according to the present invention.

FIG. 4 illustrates a schematic view of the exemplary technique illustrated in FIG. 3. The LLC frames 440 are segmented into blocks of different sizes depending on the MCS to be used. In an alternative embodiment of the present invention, a fixed code rate is used and no coding or modulation adaptation is performed.

A FCS and a header (H1) are added to the each of the segmented blocks 441. The entire block is convolutionally encoded with a rate 1/n code to produce coded block 442. To achieve different code rates, some bits are then punctured from the coded block 442. In an alternative embodiment of the present invention, the header (or a portion of the header) is less punctured, or not punctured at all, in order to increase the robustness of the header regardless of the MCS used. In addition, the header (or a portion of the header) can also be coded separately from the data using, for example, another convolutional code (possibly punctured) or a block code. Furthermore, the header can have its own FCS in order to avoid false detection of the header. Successful decoding of the header with high certainty, allows for the reliable combining and decoding of blocks. This technique can be useful with Type II Hybrid ARQ receivers by making it easier for the receiver to determine the identity of the received block (since the identity is contained in the header) so that it can be combined with the retransmitted block in the event that only the header could be decoded.

For each MCS, a number of puncturing patterns exist (e.g., $P_1$ ... $P_n$). If the initial code rate is less than 1, $P_1$ ... $P_n$ are not disjunctive. In addition, if the initial code is 1/n, $P_1$ ... $P_n$ are equal (e.g., no bits are punctured) and the IR operation of Type II Hybrid ARQ reduces to that of a repetition code. In both Type I and Type II Hybrid ARQ mode, the first block, punctured with $P_1$, is transmitted to the receiver. If decoding is unsuccessful, the second block, punctured with $P_2$ is sent, and so forth. The difference between the Type I and Type II Hybrid ARQ operation, is that in the Type I mode, the block using $P_1$ is discarded if decoding fails, and the next attempt is based solely on the block using $P_2$.

In the Type II Hybrid ARQ mode, soft information about the block using $P_1$ is stored and joint decoding, e.g., by soft combining information from $P_1$ and $P_2$, is performed. Thus, the transmitter does not need to know whether the receiver is in a Type I or Type II Hybrid ARQ mode, since the receiver will either treat each block separately (e.g., in Type I mode) or joint decode the successive blocks (e.g., in IR mode).

Figure 5A:
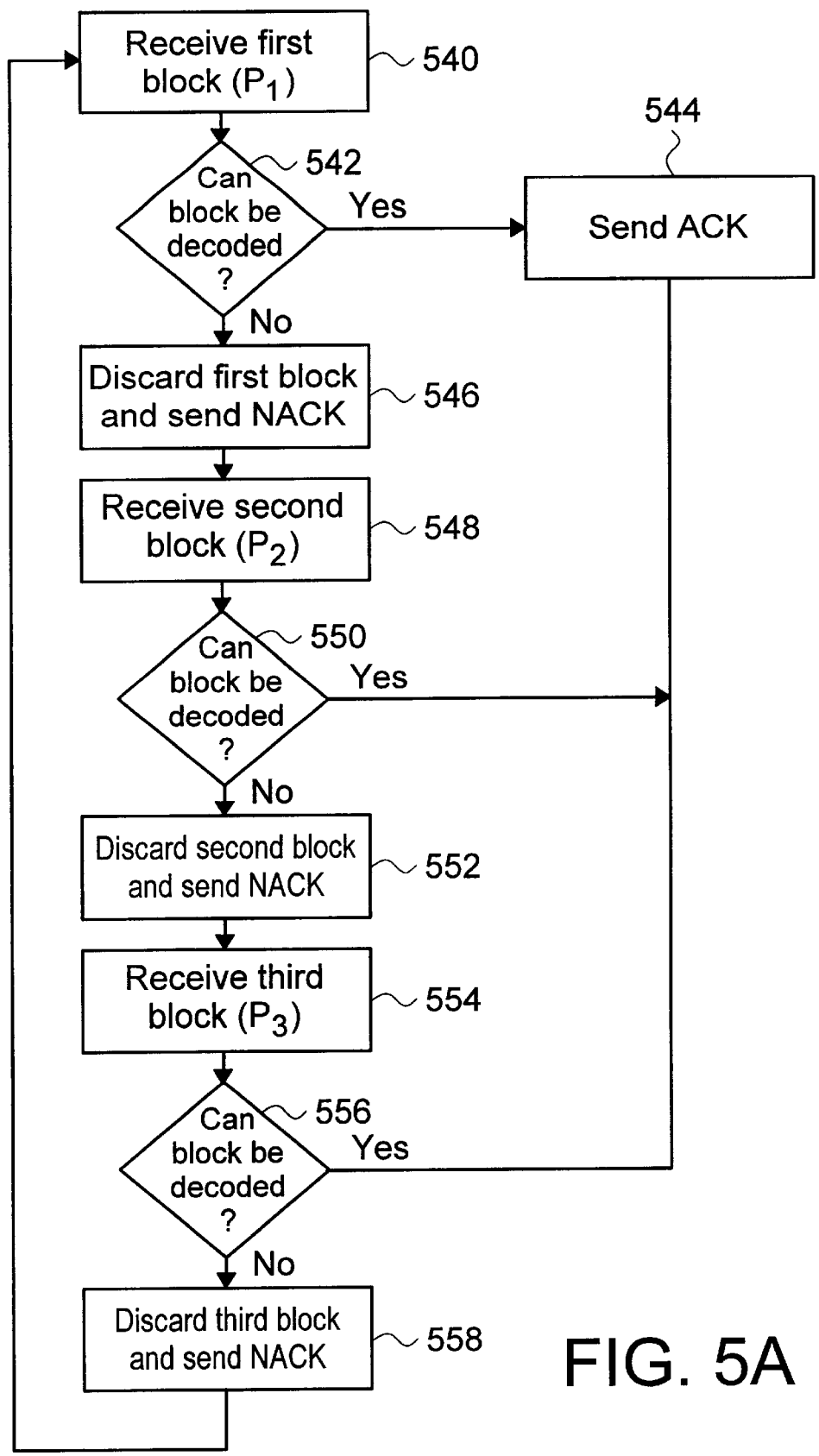
FIGS. 5A & 5B are flow charts processes performed by exemplary receivers of the present invention.

FIG. 5A illustrates a technique for receiving and decoding blocks using a receiver operating in a Type I Hybrid ARQ mode according to the present invention. The first block is received in step 540. In step 542, the receiver determines if it was able to decode the block. If the receiver was able to decode the block, using a first coding scheme, an ACK is sent in step 544 and the receiver waits for the next block of an LLC frame (or a block from a new LLC frame). If the receiver is unable to decode the block, a NACK is sent in step 546 and the first block is discarded. A second block is received in step 548 and in step 550 if the transmitter can decode the block using a second coding scheme, then an ACK is sent in step 544. If the receiver is unable to decode the block, a NACK is sent to the transmitter and the second block is discarded in step 552. A third block is received in step 554 and in step 556 if the transmitter can decode the block using a third coding scheme, then an ACK is sent in step 544. If the receiver is unable to decode the block, a NACK is sent to the transmitter and the third block is discarded in step 558. This process can be repeated for n number of coding schemes at which point the process returns to step 540 using the first coding scheme. The coding schemes (and their relative order) can be stored in the transmitter or can be sent to the transmitter in a separate control signal using, for example, side band signaling.

Figure 5B:
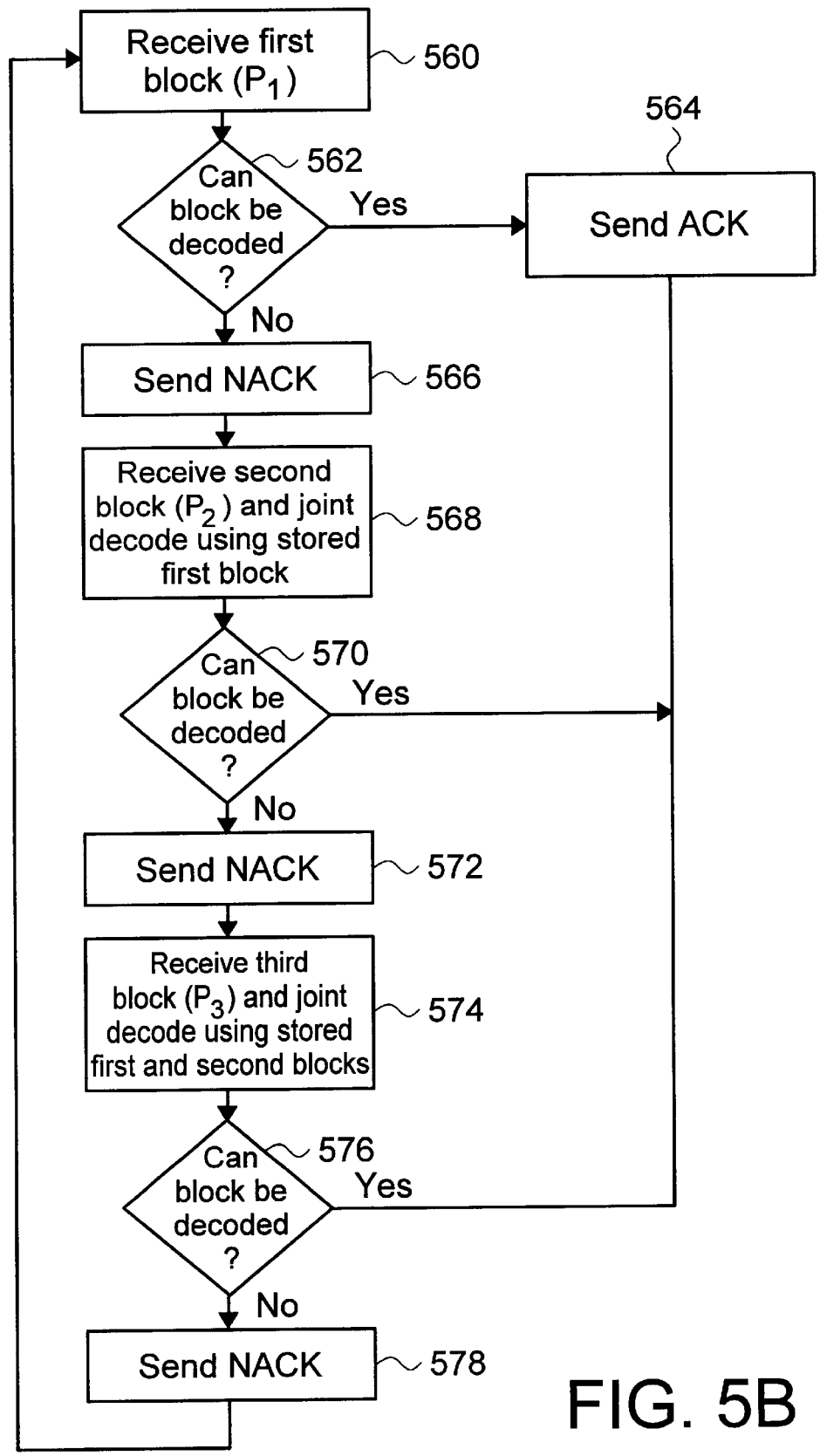

FIG. 5B illustrates a technique for receiving and decoding blocks using a receiver operating in a Type II Hybrid ARQ mode according to the present invention. The first block coded using a first coding scheme is received in step 560. In step 562, the receiver determines if it was able to decode the block. If the receiver was able to decode the block, using a first coding scheme, an ACK is sent in step 564 and the receiver waits for the next block of an LLC frame (or a block from a new LLC frame). If the receiver is unable to decode the block, a NACK is sent in step 566. A second block coded using a second coding scheme is received in step 568 and in step 570 if the transmitter can decode the block by joint decoding the first and second blocks, then an ACK is sent in step 564. If the receiver is unable to joint decode the blocks, a NACK is sent to the transmitter in step 572. A third block coded using a third coding scheme is received in step 574 and in step 576 if the transmitter can decode the block by joint decoding the first, second, and third blocks, then an ACK is sent in step 544. If the receiver is unable to decode the block, a NACK is sent to the transmitter in step 578. This process can be repeated for n number of coding schemes at which point the process returns to step 560 using the first coding scheme. The coding schemes (and their relative order) can be stored in the transmitter or can be sent to the transmitter in a separate control signal using, for example, in-band or side-band signaling.

The present invention will now be described with reference to providing Link Quality Control (LQC) in Enhanced GPRS. The initial code rate can be selected based on link quality measurements performed by the transmitter and/or receiver. Type II Hybrid ARQ operation is enabled by puncturing a different set of bits for retransmissions. Different switching points for selecting the initial code rate can be used in the LA and IR modes. In standard GPRS, selective ARQ is used and acknowledgments (ACKs) and non-acknowledgments (NACKs) are signaled using bitmaps. In order to protect the header, the header is interleaved over four GSM bursts. Using the 8PSK uncoded mode, the present invention allows for the transmission of two RLC blocks per 20 milliseconds (ms). This allows better performance if using frequency hopping techniques while limiting the ACK/NACK bitmap size and allowing robust header coding.

Figures 6A, 6B:
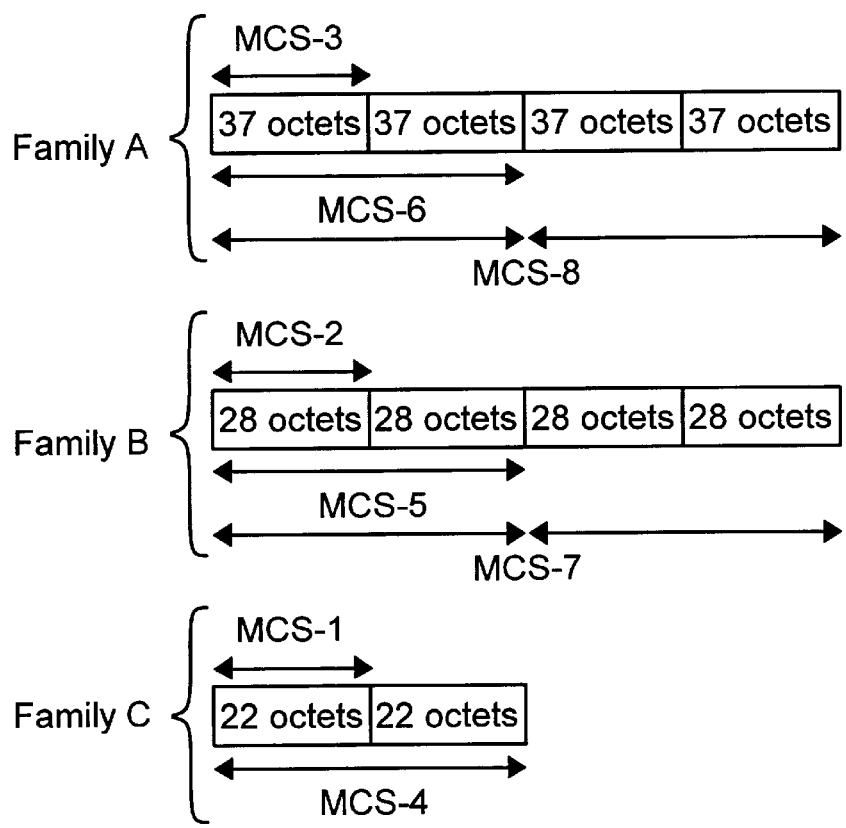
FIGS. 6A & 6B illustrate the exemplary MCSs for EGPRS.

Exemplary MCSs for EGPRS are illustrated in FIGS. 6A and 6B. The MSCs are divided into different families (e.g., A, B and C). Each family has a different basic unit of payload (e.g., 37, 28 and 22 octets, respectively). Different code rates within a family are achieved by transmitting a different number of payload units within a 20 ms block. For example, for families A and B, one, two, or four payload units are transmitted. For family C, only one or two units are transmitted.

In cases where four payload units are transmitted (MCS-7 and MCS-8), the payload units are split into two RLC blocks using separate sequence numbers and CRCs. The MCS-8 blocks are interleaved over only two bursts because it yields a better performance than interleaving over four bursts for high code rates, especially when the burst quality is uncorrelated when, for example, using a frequency hopping technique.

For an initial transmission, any MCS can be selected based on the current link quality. For retransmissions in the LA mode that require increased robustness, two alternative embodiments exist. In the first alternative embodiment, if MCS-7 or MCS-8 was initially used, the block can be retransmitted at half the original code rate using one MCS-5 or MCS-6 block respectively. In the second alternative embodiment, if MCS-4. MCS-5, or MCS-6 was initially used, the block can be transmitted using two MCS-1, MCS-2, or MSC-3 blocks respectively. In the second alternative embodiment, two bits in the header will indicate that the RLC block has been split and the relative order of the parts of the RLC block. For example, a block that was initially transmitted using uncoded 8PSK can be retransmitted using GMSK based MCS-3.

Figure 7A:
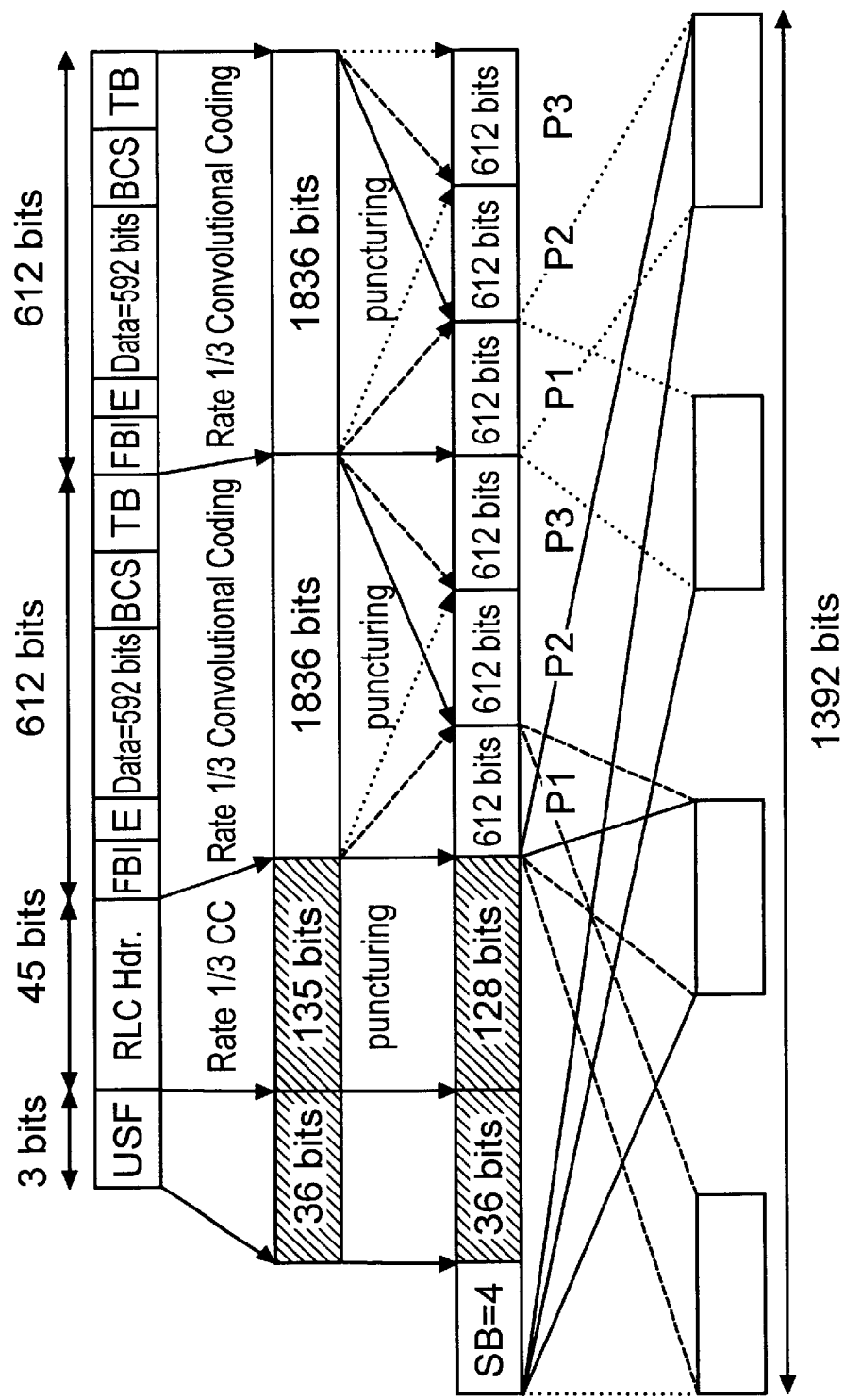
FIGS. 7A & 7B illustrate exemplary coding and puncturing schemes of the present invention.
Figure 7B:
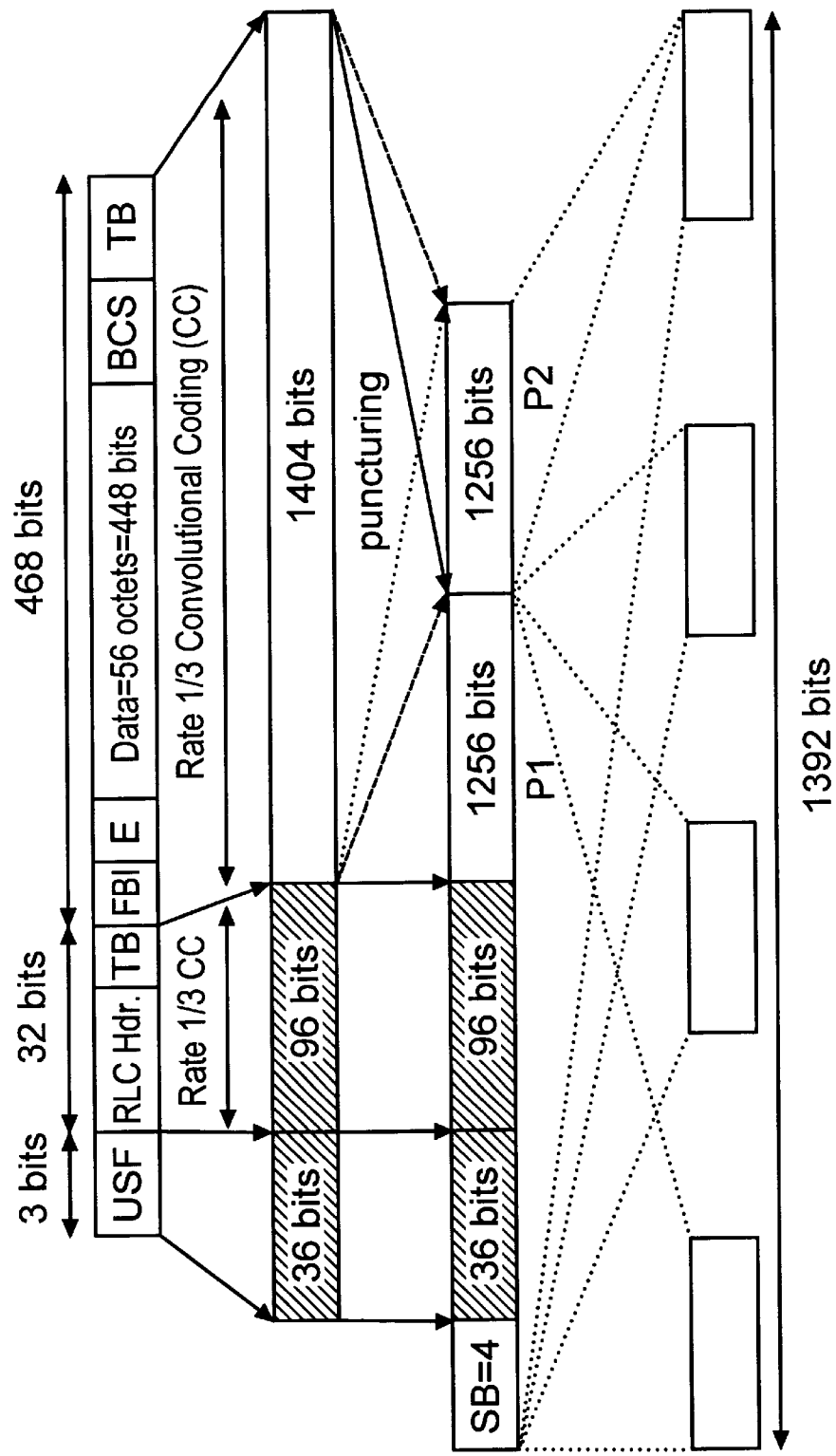

FIGS. 7A and 7B illustrate exemplary coding and puncturing schemes of the present invention using MCS-5 and MCS-8, respectively. The data block includes a Uplink State Flag (USF), a RLC Header, a Tail Bits (TB) field, a Final Block Indicator (FBI) field, an Extension bit (E) field, a data payload field, and a Block Check Sequence (BCS).

In an exemplary embodiment of the present invention, each 8PSK block includes 1392 bits and each GMSK block includes 464 bits. The USF is 36 bits for 8PSK and 12 bits for GMSK. There are four stealing bits (SB) for 8PSK indicating two different header types and eight stealing bits for GMSK indicating only one header type. The RLC headers are coded as discussed above and there are two bits used for the FBI and E fields. A 12 bit CRC and 6 bit tail are added to the payload for data protection.

In the description above, the blocks are derived with the same convolutional code, but with different puncturing patterns. Of course, one skilled in the art will recognize that the blocks can be obtained by using different convolutional codes or block codes, or a combination of both. For example, the blocks can be obtained with different, relatively low-complex convolutional codes and turbo decoding can be applied in the receiver.

Although the invention has been described in detail with reference only to a few exemplary embodiments, those skilled in the art will appreciate that various modifications can be made without departing from the invention. For example, the code rate before puncturing is not limited to any particular rate, but can be any value which is suitable for the use and environment of the present invention. Furthermore, a coded block does not have to be of a fixed size (i.e., a block may vary in size from block to block). In addition, the coded block size could be, for example, a function of the initial code rate selected. Alternatively, a different coded block size could be used, for example, for each successive block.

What is claimed is:

1. A communication system comprising:
   a transmitter that operates in an ARQ transmission mode; and
   a plurality of receivers including a first receiver that operates in a first reception mode and a second receiver that operates in a second reception mode;
   wherein said first receiver and said second receiver respectively communicate in said first and second reception modes with said transmitter while said transmitter operates in said ARQ transmission mode, and wherein said first reception mode is an ARQ mode without using incremental redundancy and said second reception mode is an ARQ mode using incremental redundancy.

2. The communication system of claim 1, wherein said first reception mode is a Type I Hybrid ARQ mode and said second reception mode is a Type II Hybrid ARQ mode.

3. The communication system of claim 1, wherein said ARQ transmission mode is a Type II Hybrid ARQ mode adapted to retransmit blocks that are coded differently than an originally transmitted block, and wherein each retransmitted block has a substantially equal probability of being independently decoded.

4. The communication system of claim 3, wherein said blocks are coded differently by changing a puncturing pattern for each retransmitted block.

5. The communication system of claim 4, wherein said ARQ transmission mode includes link adaptation.

6. The communication system of claim 3, wherein said blocks are coded differently by changing a convolutional code for each retransmitted block.

7. The communication system of claim 1, wherein said ARQ transmission mode includes link adaptation.

8. A communication system comprising:
   a transmitter that operates in an ARQ transmission mode; and
   a plurality of receivers including a first receiver that operates in a first reception mode and a second receiver that operates in a second reception mode;
   wherein said first receiver and said second receiver communicate with said transmitter while said transmitter operates in said ARQ transmission mode, wherein said ARQ transmission mode uses incremental redundancy, wherein retransmitted blocks are coded differently than an original transmitted block, and wherein each retransmitted block has a substantially equal probability of being independently decoded.

9. The communication system of claim 8, wherein said first reception mode is an ARQ mode without using incremental redundancy and said second reception mode is an ARQ mode using incremental redundancy.

10. The communication system of claim 8, wherein said blocks are coded differently by changing a puncturing pattern for each retransmitted block.

11. The communication system of claim 10, wherein a code rate is varied by changing said puncturing pattern.

12. The communication system of claim 8, wherein said blocks are coded differently by changing a convolutional code for each retransmitted block.

13. The communication system of claim 8, wherein said ARQ transmission mode includes link adaptation and wherein different code rates for link adaptation as well as different coded versions for incremental redundancy are created by puncturing the same convolutional code.

14. A communication device that operates in an ARQ mode comprising:
   a receiver that receives a block and one or more retransmitted blocks,
   wherein said receiver individually processes each of said one or more retransmitted blocks in successive order using a different coding scheme, and
   wherein said block and each of said one or more retransmitted blocks are coded using said plurality of coding schemes and have a substantially equal probability of being independently decoded by said communication device.

15. The communication device of claim 14, wherein said ARQ mode is a Type I Hybrid ARQ mode.

16. The communication device of claim 14, wherein each of said coding schemes uses a different puncturing pattern.

17. The communication device of claim 14, wherein each of said coding schemes uses a convolutional code.

18. A method of transmitting and receiving blocks in a communication system comprising:
   transmitting said blocks in an ARQ transmission mode;
   receiving said blocks, at a first receiver, operating in a first reception mode; and
   receiving said blocks, at a second receiver, operating in a second reception mode, wherein said first reception mode is an ARQ mode without using incremental redundancy and said second reception mode is an ARQ mode using incremental redundancy.

19. The method of claim 18, wherein said first reception mode is a Type I Hybrid ARQ mode and said second reception mode is a Type II Hybrid ARQ mode.

20. The method of claim 18, wherein said ARQ transmission mode is a Type II Hybrid ARQ mode adapted to retransmit blocks that are coded differently than an originally transmitted block, and wherein each retransmitted block has a substantially equal probability of being independently decoded.

21. The method of claim 20, wherein said blocks are coded differently by changing a puncturing pattern for each retransmitted block.

22. The method of claim 21, wherein said ARQ transmission mode includes link adaptation.

23. The method of claim 20, wherein said blocks are coded differently by changing a convolutional code for each retransmitted block.

24. The method of claim 18, wherein said ARQ transmission mode includes link adaptation.

25. A method of transmitting and receiving blocks in a communication system comprising:
   transmitting said blocks in an ARQ transmission mode;
   receiving said blocks, at a first receiver, operating in a first reception mode; and
   receiving said blocks, at a second receiver, operating in a second reception mode, wherein said ARQ transmission mode uses incremental redundancy, wherein retransmitted blocks are coded differently than an original transmitted block, and wherein each retransmitted block has a substantially equal probability of being independently decoded.

26. The method of claim 25, wherein said first reception mode is an ARQ mode without using incremental redundancy and said second reception mode is an ARQ mode using incremental redundancy.

27. The method of claim 26, wherein said blocks are coded differently by changing a convolutional code for each retransmitted block.

28. The method of claim 25, wherein said blocks are coded differently by changing a puncturing pattern for each retransmitted block.

29. The method of claim 28, wherein a code rate is varied by changing said puncturing pattern.

30. The method of claim 25, wherein said ARQ transmission mode includes link adaptation and wherein different code rates for link adaptation as well as different coded versions for incremental redundancy are created by puncturing the same convolutional code.

31. A method of receiving a block from a transmitter comprising:
   receiving, at a receiver, said block and one or more retransmitted blocks from said transmitter; and
   individually processing, at the receiver, each of said one or more retransmitted blocks in successive order using a different coding scheme,
   wherein said block and each of said one or more retransmitted blocks are coded using said plurality of coding schemes and have a substantially equal probability of being independently decoded by the receiver.

32. The method of claim 31, wherein said ARQ mode is a Type I Hybrid ARQ mode.

33. The method of claim 31, wherein each of said coding schemes uses a different puncturing pattern.

34. The method of claim 31, wherein each of said coding schemes uses a convolutional code.

35. A method of receiving one or more payloads of data in an ARQ system comprising:
   selecting an initial family of modulation and coding scheme (MCS), wherein each family has a different basic unit of payload;
   transmitting said one or more payloads of data with an initial code rate selected from said selected initial family of MCS;
   receiving said one or more payloads with said initial code rate;
   retransmitting said one or more payloads using a code rate which is a function of said initial code rate and selected from said selected initial family of MCS; and
   successively processing, at the receiver, said one or more payloads and said retransmitted one or more payloads using the respective code rate to decode payload.

36. The method of claim 35, wherein the steps of retransmission and successively processing are repeated until acknowledgment is received that said payload has successfully been decoded.

37. The method of claim 35, wherein the initial and retransmitted one or more payloads of data are stored and subsequently combined in the decoding process.

38. The method of claim 35, wherein the decoding process is conditioned solely on the prevailing transmission.

39. The method of claim 35, wherein the code rates are incremental redundancy modes of the selected family of MCS.

40. The method of claim 35, wherein said initial code rate is selected based on the link quality, and wherein said coding rate is relative to the number of payloads transmitted.

41. A method of receiving a block of data from a transmitter in an ARQ system comprising:
   selecting from a group of families an initial family of modulation and coding scheme (MCS);
   transmitting said block of data with an initial coding scheme selected from said selected initial family of MCS;
   receiving said block of data with said initial coding scheme;
   retransmitting said block of data, wherein said block of data is retransmitted using a coding scheme selected from the selected initial family of MCS; and
   processing, at the receiver, said initial block and each of said retransmitted blocks using the respective coding scheme to decode said block of data.

42. The method of claim 41, wherein a header part of said initial block and said retransmitted block is robustly coded so that the receiver is able to determine the block and respective coding scheme, even if said block of data cannot be decoded.

43. The method of claim 41, wherein the initial and retransmitted blocks of data are stored and subsequently combined in the decoding process.

44. The method of claim 41, wherein the decoding process is conditioned solely on the prevailing transmission.

45. The method of claim 44, wherein said group of families comprises:
   a first family of MCSs which includes MCS-3, MCS-6 and MCS-8;
   a second family of MCSs which includes MCS-2, MCS-5 and MCS-7; and
   a third family of MCSs which includes MCS-1 and MCS-4.

46. The method of claim 41, wherein the selection of the initial family of MCS is based on link quality.

47. A method of transmitting a block of data from a transmitter to a receiver comprising the steps of:
   selecting an initial family of modulation and coding schemes based on link quality;
   coding said block of data with a first modulation and coding scheme selected from said initial family of modulation and coding schemes;
   transmitting the coded block of data to the receiver;
   selecting another modulation and coding scheme from the initial family of modulation and coding schemes; and
   retransmitting said block of data, wherein the retransmitted block of data is coded with the another modulation and coding scheme.

48. The method of claim 47, wherein said block of data is transmitted with a header, wherein the header is coded with a different modulation and coding scheme than the block of data.

* * * * *